United States Patent [19]

Severson

[11] 4,092,082
[45] May 30, 1978

[54] METAL CUTTING TOOL WITH ANVIL-HELD INDEXIBLE AND REPLACEABLE CUTTER INSERTS

[75] Inventor: Ole Charles Severson, Shelton, Conn.

[73] Assignee: The Viking Tool Company, Shelton, Conn.

[21] Appl. No.: 731,792

[22] Filed: Oct. 12, 1976

[51] Int. Cl.² .............................................. B26D 1/12
[52] U.S. Cl. ...................................... 407/40; 407/42; 407/46; 407/50; 407/51
[58] Field of Search .............. 29/95, 96, 105 R, 105 A

[56] References Cited

U.S. PATENT DOCUMENTS

| 2,823,447 | 2/1958 | Doerseln et al. | 29/96 |
| 3,239,911 | 3/1966 | Williams | 29/96 |
| 3,578,742 | 5/1971 | Manthei | 29/96 |

FOREIGN PATENT DOCUMENTS

| 1,143,082 | 3/1960 | Germany | 29/105 A |
| 810,197 | 6/1955 | United Kingdom | 29/96 |
| 818,262 | 8/1959 | United Kingdom | 29/96 |

Primary Examiner—Harrison L. Hinson
Attorney, Agent, or Firm—Wooster, Davis & Cifelli

[57] ABSTRACT

Metal cutting tools comprise a tool body including a shank and generally cylindrical tool head having top and circumferential surfaces. The tool head defines a plurality of generally radially extending slots spaced at intervals about the tool head. The slots open on both the top and circumferential surfaces of the tool head. Each slot matingly receives a U-shaped anvil. A cutter insert is clamped between the legs of the U-shaped anvil and butts against the U-shaped anvil and tool head to position the cutter insert in the metal cutting tool with at least one cutting edge exposed. The cutter inserts have polygonal shapes, square and triangular shapes being shown, and are indexible and replaceable. The U-shaped anvils are also replaceable. The metal cutting tools accurately mount the cutter inserts, are of high strength and durability, and have a long service life by virtue of the replaceability of the cutter inserts and U-shaped anvils.

13 Claims, 7 Drawing Figures

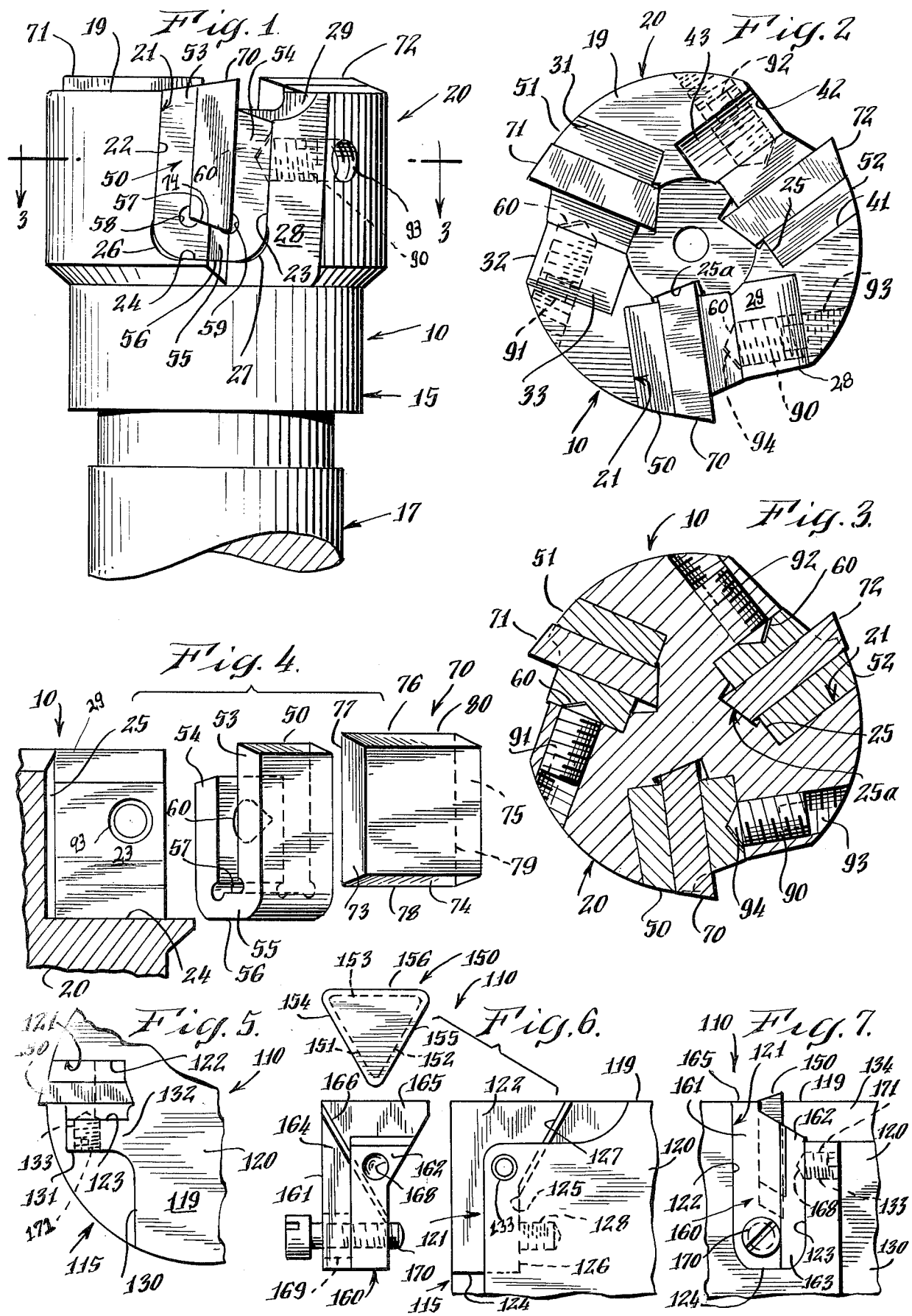

METAL CUTTING TOOL WITH ANVIL-HELD INDEXIBLE AND REPLACEABLE CUTTER INSERTS

BACKGROUND OF THE INVENTION

This invention relates to a cutting tool, and more particularly to a rotatable tool for cutting metal which includes generally U-shaped replaceable anvils which hold and position replaceable cutter inserts therein.

In many metal cutting tool assemblies, separate indexible and replaceable cutter inserts are utilized with a tool holder, and the advantages of such cutter inserts are generally recognized in the machine tool art. Perhaps the principal advantage is that the indexible and replaceable cutter inserts can be indexed and ultimately replaced as they became worn or damaged, while continuing to use the same basic tool over a substantial period of time.

However, prior art metal cutting tools employing indexible and replaceable cutter inserts have not been fully satisfactory. Particular problems have arisen in providing compact and secure means for mounting the indexible and replaceable cutter inserts in the metal cutting tools, and associated therewith has been the problem of mounting a substantial number of indexible and replaceable cutter inserts in a small cutting tool. Further, the prior mechanisms or designs for mounting indexible and replaceable cutter inserts to the metal cutting tools have not sufficiently accurately positioned the indexible and replaceable cutter inserts with respect to the tool itself to permit close tolerance cutting and milling operations with such metal cutting tools.

SUMMARY OF THE INVENTION

The metal cutting tools according to the invention herein, which may be boring bars or other metal cutting tools, generally comprise a tool body having a head and a shank, a plurality of generally U-shaped anvils received in an equal plurality of open slots formed in the tool head, an equal plurality of indexible and replaceable cutter inserts, one cutter insert being removably positioned between the legs of each U-shaped anvil, and means for urging the legs of each U-shaped anvil together to clamp the cutter insert therebetween and to secure the anvil and cutter insert in the tool head.

In one embodiment of the invention, the cutter inserts are square. With respect to each cutter insert and its associated U-shaped anvil, one edge of the cutter insert is seated against an accurately machined surface extending generally parallel to the rotational axis of the metal cutting tool, said surface partially defining the open slot or pocket in which the cutter insert the U-shaped anvil member are received. An adjacent edge of the cutter insert is seated against the base of the U-shaped anvil, which is in turn seated against an accurately machined surface disposed radially in the tool head and further defining the open slot or pocket. Thus, only two accurately machined surfaces in the tool head are required for accurately positioning each cutter insert therein. The means for urging the legs of the U-shaped anvil together in order to clamp and hold the cutter insert therebetween, which further serves to hold the cutter insert-U-shaped anvil assembly in the tool head, preferably comprises a single set screw threaded through an opening in the tool head to bear against one leg of the U-shaped anvil member. A conical depression may be formed in the U-shaped anvil leg offset with respect to the end of the set screw such that the U-shaped anvil is biased toward the accurately machined surfaces in order to insure proper seating and positioning of the cutter insert. The remaining cutter inserts and their associated U-shaped anvils are mounted similarly in the tool head at equally spaced positions thereabout. Only a single set screw need be released and tightened in order to index or replace a cutter insert, or replace a U-shaped anvil should damage to it occur.

In another embodiment of the invention, the cutter inserts are triangular, and inclined surfaces are accurately machined in the tool head and partially define the open slots or pockets in which the cutter inserts and U-shaped anvils are received. One edge of the triangular cutter insert abuts against the inclined machined surface, thereby accurately positioning the cutter insert.

The metal cutting tools according to the invention herein are advantageous in that they employ indexible and replaceable cutter inserts with all the well-known attendant benefits. The U-shaped anvils associated with the cutter inserts are also replaceable, and the overall result is that the metal cutting tool itself is well protected from damage and rarely needs to be replaced. Further, the mounting arrangement of the cutter inserts, including the U-shaped anvils, is both accurate and requires only a small amount of space in the tool head, wherein a large plurality of cutter inserts may be mounted in a relatively small metal cutting tool without impairing its overall strength. Indexing or replacement of the cutter inserts and replacement of the U-shaped anvil mounting members is also easily accomplished.

OBJECTS OF THE INVENTION

Accordingly, a principal object of the invention is to provide an improved metal cutting tool including indexible and replaceable cutter inserts.

Another object of the invention is to provide an improved metal cutting tool including means for securely and accurately mounting indexible and replaceable cutter inserts.

A further object of the invention is to provide an improved metal cutting tool including means for securely and accurately mounting indexible and replaceable cutting inserts wherein the mounting means themselves are removable and replaceable.

An additional object of the invention is to provide an improved metal cutting tool including means for securely and accurately mounting indexible and replaceable cutter inserts wherein the cutter inserts may be easily and quickly indexed or replaced.

Yet another object of the invention is to provide an improved metal cutting tool including indexible and replaceable cutter inserts wherein a minimum amount of material is removed from the tool in order to accommodate the indexible and replaceable cutter inserts and their mounting means, thereby achieving a tool of maximum strength on which a large plurality of cutter inserts may be mounted with respect to the tool's size.

A still further object of the invention is to provide an improved metal cutting tool including indexible and replaceable cutter inserts wherein a minimum of precision machining is necessary in fabricating the tool while nevertheless achieving accurate positioning of the indexible and replaceable cutter inserts.

Other and more specific objects of the invention will in part be obvious and will in part appear from the following description of the preferred embodiments, taken together with the drawings.

DRAWINGS

FIG. 1 is a side elevation view of a metal cutting tool according to the invention herein;

FIG. 2 is a top elevation view of the metal cutting tool of FIG. 1;

FIG. 3 is a sectional view of the metal cutting tool of FIG. 1 taken along the line 3—3 of FIG. 1;

FIG. 4 is a cut away view, partially in section, of the metal cutting tool of FIG. 1 showing a cutter insert and U-shaped anvil exploded outwardly therefrom;

FIG. 5 is a top elevation view, partially cut away, of another metal cutting tool according to the invention herein;

FIG. 6 is a side elevation view, partially cut away and in section, and exploded, of the metal cutting tool of FIG. 5; and FIG. 7 is another side elevation view of the metal cutting tool of FIG. 5 rotated with respect to FIGS. 5 and 6.

The same reference numbers refer to the same elements throughout the various figures.

DESCRIPTION OF THE PREFERRED EMBODIMENTS

The invention herein relates to metal cutting tools for use in screw mills or other milling machines as boring bars, slotting mills, half-side mills, end mills, and in other ways which will be appreciated by those skilled in the art. The metal cutting tools according to the invention herein incorporate indexible and replaceable cutter inserts. Cutter inserts as contemplated by the instant invention are in the form of relatively small solid wafers of a suitable hard, metal-cutting material, such as a high-speed tool steel, a cast alloy, a carbide such as tungsten carbide or the like, or ceramic. These wafers may vary in the shape of their plan outline, and principally may take any polygonal shape. The important advantages of utilizing such cutter inserts in metal cutting tools are well recognized, and include principally the capability of providing new cutting surfaces through indexing and replacing the cutter inserts while continuing to use the basic metal cutting tool.

The metal cutting tools according to the invention are characterized by providing a firm, solid mounting of the cutter insert in a tool body to maintain the stability of the cutter inserts against forces generated during use of the metal cutting tool. To this end, each cutter insert is mounted in a slot or pocket formed by removing a minimum amount of stock material from the basic tool body, thereby maximizing the strength of that which remains. Each cutter insert is mounted in its respective slot or pocket by means of a hardened removable and replaceable U-shaped anvil. Each cutter insert is seated firmly against the tool body itself and also against the U-shaped anvil, which in turn seats against a surface of the tool body, whereby the cutter insert is accurately positioned. The relatively simple relationship between the cutter insert, U-shaped anvil and tool body reduces the initial cost of the tool, and further results in the metal cutting tool retaining a high level of effectiveness and economic value throughout a substantial period of use.

Referring now to FIGS. 1–4, a metal cutting tool 10 according to the invention herein is shown. It generally comprises a tool body 15 in which are mounted three U-shaped anvils 50-52, the U-shaped anvils further respectively mounting three indexible and replaceable cutter inserts 70-72. Three set screws 90-92 serve to secure, respectively, the U-shaped anvils and cutter inserts in the tool body.

Cutter inserts 70-72 are identical and interchangeable. They are square as viewed in plan, as best illustrated in FIG. 4. The side surfaces, e.g. surfaces 73-76, are beveled away from the cutting edges 77-80. The cutter inserts are preferably fabricated of a suitable hard, metal-cutting material. It will be understood that additional cutter inserts may be provided as replacements.

The tool body 15 comprises a cylindrical shank 17, shown partially cut away in FIG. 1, which is adapted for being received in screw mills or the like, in accordance with the usual practice in the art. The tool body 15 further comprises a tool head 20, which is also generally cylindrical and is adapted to receive and hold the cutter inserts 70-72 and their associated U-shaped anvils 50-52.

Cutter insert 70, its associated U-shaped anvil 50, and their relationship to the tool head 20 will be described in detail. It will be understood that the remaining cutter inserts 71 and 72, their associated U-shaped anvils 51 and 52, and their relationship to the tool head 20 are similar. In this regard, it should be noted that the U-shaped anvils 50-52 are identical, as are the cutter inserts 70-72, wherein these members may be interchanged or replaced with other identical members, all resulting in the same operative metal cutting tool 10.

The tool head 20 is provided with a U-shaped slot 21 which is open radially outwardly and along the top surface 19 of tool head 20. The U-shaped slot 21 is partially defined by parallel facing walls 22 and 23 of tool head 20 which lie along the legs of the "U". The bottom or radially disposed surface 24 which further defines the U-shaped slot 21, best seen in FIGS. 1 and 4, is accurately machined to close tolerances and serves to axially position U-shaped anvil 50, which in turn accurately positions cutter insert 70, as more fully described below. It should be noted that the curved transition surfaces 26 and 27 between the sidewalls 22, 23 and bottom surface 24 need not closely follow the shape of the U-shaped anvil 50, wherein these surfaces need not be machined or formed to close tolerances. The central portion 25a of adjacent axially disposed stepped surface 25, also defining slot 21 and best seen in FIGS. 2-4, is accurately machined to close tolerances for radially positioning the cutter insert 70, as also more fully described below. Slots 31 and 41 are similar, and the three U-shaped slots 21, 31 and 41 are spaced equidistant about the periphery of tool head 20.

The metal cutting tool 10 shown in FIGS. 1-4 is designed for right hand rotation, or counterclockwise rotation as viewed in FIG. 2, and portions of the generally cylindrical tool head 20 are cut away to leave flat surfaces 28, 32 and 42 adjacent the leading sides of U-shaped slots 21, 31 and 41, thereby more fully exposing the cutting edges of the cutter inserts and providing space for the material cut away by the operation of the metal cutting tool 10 until such material is carried away. In a similar manner, portions of the end surface 19 of tool head 20 are cut away to provide curved recessed surfaces 29, 33 and 43 adjacent the leading edges of slots 21, 31 and 41, respectively.

The U-shaped slot 21 receives a U-shaped anvil 50 in substantially mating relationship. The anvil 50 is preferably fabricated of hardened tool steel. The anvil 50 is generally comprised of parallel legs 53 and 54 connected by a base 55. The cutter insert 70 is received between legs 53 and 54, with its beveled side surface 73 butting against the correspondingly beveled surface 25a of slot 21, thereby radially positioning the cutter insert 70.

The base 55 of anvil 50 serves to axially position the cutter insert 70. It includes a bottom surface 56 which seats on the accurately machined surface 24 at the bottom of slot 21. Juxtaposed surface 56 and on the inside of anvil 50 is a beveled surface 57 against which butts the beveled side surface 74 of cutter insert 70. As best seen in FIGS. 1 and 4, the anvil 50 may be drilled or otherwise cut away at the intersection of the legs and base thereof, as indicated at 58 and 59, to provide clearance for machining surface 57 and to avoid the necessity of carefully milling a corner at those positions. Thus, the base 55 of anvil 50 spaces the cutter insert 70 from bottom surface 24 of U-shaped slot 21 formed in the tool head 20, and thereby axially positions the cutter insert 70. The base 55 of anvil 50 and the bases of the other anvils 51 and 52 are of uniform thickness, and the bottom surfaces of the other slots 31 and 41 are accurately machined as is the bottom surface 24 of slot 21, so that all of the cutter inserts are accurately axially positioned with respect to the given point on the axis of rotation of the metal cutting tool and the cutting surfaces lie in the same plane for smooth cutting. It is recognized, however, that there may be some slight variation in the axial positioning of the cutter inserts due to the tolerances attendant with machining the bottom surfaces of the slots, tolerances in the thicknesses of the bases of the anvils, and even the tolerances of the dimensions of the cutter inserts themselves. These normal variations in axial positioning of the cutter inserts are acceptable in many milling and finishing operations, and the cutter inserts are considered to be accurately positioned despite slight variations due to tolerances.

However, in some instances it is desired to have extremely accurate positioning of the cutter inserts, and more particularly, of the exposed cutting edges thereof, and this can be achieved by specially machining the base of each anvil to compensate for slight inaccuracies, such as those within normal tolerances in the position of bottom surface of the slot in which the anvil is seated. Of course, cutter inserts of closer tolerances are also used when such extremely accurate positioning is desired. Thus, the stock tool body is adaptable to assembling an exceedingly accurate metal cutting tool to very close tolerances with a minimum amount of extra machining, which is a feature of the design according to the invention herein.

Legs 53 and 54 of the anvil 50 extend upwardly from the base 55 thereof and flank the cutter insert 70. The legs 53 and 54 are respectively adjacent the parallel facing surfaces 22 and 23 defining partially slot 21. Leg 53 is longer than leg 54, and extends to the top of cutter insert 70 and supports it in the slot 21. The shorter leg 54 is axially and radially thinner than leg 53, as seen in FIGS. 1, 2 and 3, such that it does not extend beyond surfaces 28 and 29 of tool head 20.

The anvil 50 and cutter insert 70 are held in slot 21 by means of a set screw 90. Set screw 90 is received in a threaded opening 93 formed in the tool head 20 generally perpendicularly to the sidewall 23 of slot 21. The set screw 90 is preferably provided with an allen head such that the set screw may be received entirely in opening 93 and not protrude from the tool head 20 when it is tightened. The set screw 90 is provided with a pointed tip 94, and the leg 54 of anvil 50 is provided with a conical depression 60 which receives the pointed tip 94 of set screw 90. However, the conical depression 60 is offset axially upwardly and radially outwardly with respect to the pointed tip 94 of set screw 90 such that the interengagement between the pointed tip 94 and conical depression 60 tends to urge the anvil 50 inwardly and downwardly to firmly seat it within slot 21.

The set screw 90 also urges the legs 53 and 54 of anvil 50 together, thereby clamping the cutter insert 70 therebetween and also pressing the anvil-cutter insert subassembly against wall 22 of slot 21, securing the anvil 50 and cutter insert 70 therein.

It should be noted that this mounting structure permits easy indexing or replacing of the cutter insert 70, and that the anvil 50 can also be easily replaced, if necessary. In particular, loosening the set screw 90 releases the cutter insert 70, which may be removed and rotated one-quarter turn to provide one fresh cutting edge or one-half turn to provide two fresh cutting edges along both the end and circumference of the tool head 20. When the set screw is only slightly loosened to permit indexing or replacing of the cutter insert 70, the anvil is retained in the slot 21 by continuing interengagement between the tip 94 of set screw 90 and conical depression 60. However, upon further loosening of set screw 90, the anvil 50 can also be removed and replaced, if necessary.

As illustrated, the cutter inserts 70–72 are mounted with both positive axial rake and positive radial rake, however, it will be understood that the axial and/or radial rakes could be neutral or negative, and the positive rakes shown are merely an illustrative design choice.

The foregoing described the cutter insert 70, the anvil 50, and their mounting in slot 21 in tool head 20, being secured by set screw 90. The remaining cutter inserts 71 and 72 and their associated anvils 51 and 52 are similarly respectively mounted in slots 31 and 41 formed in the tool head 20. Set screws 92 and 91 are utilized to secure, respectively, those cutter inserts and anvils in the tool head 20. The slots 31 and 41 are shaped identically to slot 21, and anvil members 51 and 52 are interchangeable with anvil 50. The cutter inserts 71 and 72 are also identical.

It can be seen from the various figures that the three cutter inserts 70–72 mounted in the tool head 20 provide a substantial amount of cutting edge with respect to the size of the metal cutting tool 10. It is also apparent from the drawings that a relatively small amount of material need be removed from the tool head 20 to accommodate and mount the anvils and cutter inserts. Inasmuch as a substantial amount of material remains, the metal cutting tool 10 is a strong tool.

The fabrication of the tool body 15 requires only two accurately machined surfaces, e.g. surfaces 24 and 25a of slot 21, per cutter insert mounted. Thus, the tool body is relatively simple and inexpensive to produce. Further, the tool body itself is not likely to be damaged, inasmuch as the cutter inserts and, to a lesser extent, the anvils, are the elements active in cutting and milling operations.

The metal cutting tool 10 described above could be characterized as a general purpose metal cutting tool, suitable for cutting along either its end surface or circumference, or both.

Another metal cutting tool 110 according to the invention herein is shown in FIGS. 5-7. The metal cutting tool 110 is characterized primarily by the inclusion of triangular cutter inserts, and attendant changes in the configuration of the associated mounting anvils and slots defined by the tool head for mounting the cutter inserts and anvils.

More particularly, the metal cutting tool 110 generally comprises a tool body 115 including the shank and a generally cylindrical tool head 120. The shank and a substantial portion of the tool head are not shown, but are similar to those of metal cutting tool 10 illustrated in FIGS. 1-4, except for the differences apparent from the portions of metal cutting tool 110 which are shown.

The metal cutting tool 110 further comprises a triangular cutter insert 150 mounted by means of a U-shaped anvil 160 in a slot 121 formed in the tool head 120. The cutter insert 150 is triangular when viewed in plan, and equilateral, as best seen in FIG. 6. It includes three beveled side surfaces 151-153, and three cutting edges 154-156.

The tool head 120 is provided with a U-shaped slot 121 which is open radially outwardly and along the top surface 119 of the tool head 120. The U-shaped slot 121 is partially defined by parallel facing walls 122- 123 of tool head 120, which lie along the legs of the "U", as best seen in FIGS. 5 and 7. A bottom, radially disposed surface 124 extends between walls 122 and 123 and further defines the U-shaped slot 121, as best seen in FIGS. 6 and 7. Referring particularly to FIG. 6, an inside wall 125 defining slot 121 is divided into two portions; a first portion 126 which is parallel to the axis of the metal cutting tool 110 and extends upwardly from the bottom 124 of slot 121, and an upper portion 127 which is slanted diagonally inwardly. The portion 127 of inside wall 125 of slot 121 is beveled to receive the beveled side surface 152 of the triangular cutter insert 150. The upper portion of walls 122 and 123 extend inwardly to the beveled surface 127, again as best seen in FIG. 6. The surface 127 is accurately machined, and serves to position the cutter insert 150, as more fully described below. A threaded opening 128 extends radially inwardly from the lower portion 126 of the inside wall 125 of slot 121.

The anvil 160 is U-shaped, as best seen in FIG. 7. It generally comprises two parallel legs 161 and 162 which are connected by a base 163. Leg 161 has a thicker outer portion 164 and a thinner inner portion 165 which are connected by a beveled surface 166 diagonally disposed across leg 161. The beveled surface 166 is adapted to receive the beveled side surface 151 of triangular cutter insert 150. The other leg 162 is thinner than leg 161, and has formed therein a conical depression 168. An opening 169 is formed through the base 163 of anvil 160.

It will be noted that the tool head 120 is cut away adjacent slot 121 and ahead of it (as the tool is rotated). In particular, the tool head is cut away to define a flat surface 130 generally perpendicular to the slot 121 and an adjacent flat surface 131 generally parallel to slot 121. Thus, the tool head 120 comprises a wall 132 between the surface 131 and the surface 123 partially defining the slot 121, and a threaded opening 133 is formed through the wall 132. The tool head is also cut away, as indicated at 134, to more fully expose the operative cutting edge of triangular insert 150.

The anvil 160 is inserted into the slot 121 and held therein by a screw 170 which passes through the opening 169 in the base of anvil 160 and is received in threaded opening 128 in the tool head 120. The triangular cutter insert 150 is placed between the legs 161 and 162 of the anvil 160. Beveled side surface 151 of the triangular cutter insert 150 is matingly received against the beveled surface 166 of anvil 160, and beveled side surface 152 of cutter insert 150 is matingly received against beveled surface 127 of the tool head 120. The cutter insert 150 is thereby accurately positioned in the metal cutting tool 110. A set screw 171 is threaded into opening 133 in wall 132, and the conical tip of set screw 171 is received in the conical depression 168 on leg 162 of anvil 160. Set screw 171 is tightened to urge the legs 161, 162 of anvil 160 together, thereby clamping the cutter insert 150 therebetween, and further pressing the anvil 160 holding the cutter insert 150 against the opposite side wall 122 of the slot 121. The anvil 160 and cutter insert 150 are thereby securely mounted in the metal cutting tool 110 with the cutting edge 156 of triangular cutter insert 150 exposed above the tool head 120.

The cutter insert 150 is mounted with both neutral axial rake and neutral radial rake. Other rakes can be provided by slightly altering the structure, and the rake is not a critical factor in the design of the metal cutting tool 110.

The triangular cutter insert 150 is easily indexed or replaced by loosening the set screw 171. The anvil itself may be replaced by loosening both screw 170 and set screw 171. It should, however, be noted that screw 170 is not critical to the structure of the metal cutting tool 110 although it does provide a more secure structure.

It will be understood that a plurality of triangular cutter inserts may be and preferably are mounted in the metal cutting tool 110 utilizing anvils in slots arrayed about the tool head 120, and only one cutter insert and its associated anvil are shown for simplicity in the cut away Figures.

The metal cutting tool 110 is best suited for end milling operations, inasmuch as an exposed cutting edge is available along the top surface 119 of the tool head 120. The metal cutting tool 110 has similar advantages as those described above with respect to metal cutting tool 10, including being a strong tool in which cutter inserts are firmly and securely mounted and yet are easily indexed or replaced.

Accordingly, the foregoing metal cutting tools satisfy the stated objects of the invention and are also advantageous in other ways apparent to those skilled in the art. It will be appreciated that various changes may be made from the detailed description of the preferred embodiments without departing from the spirit and scope of the invention. For instance, the number or position of cutter inserts mounted on a metal cutting tool can be altered, and the cutter inserts may be mounted at intervals about the tool head which are not equally spaced apart, but are positioned to prevent harmonic vibrations during cutting operations. Also, the cutting geometry of the cutter inserts may be altered to achieve specific desired configurations during cutting operations, or to adapt the tool to the material to be machined and different sets of cutter inserts may be used with the same tool body. The metal cutting tools described herein are, of course, also useful in cutting plastic or other materials as well as metal. It will also be understood that the shape of the cutter inserts is not limited to square, triangular or even to regular polygonal shapes, but that a variety of shapes of cutter inserts that lend themselves to similar assembly may be employed in practicing the invention.

I claim:

1. A metal cutting tool comprising:
   (A) a tool body including a shank and a generally cylindrical tool head having top and circumferential surfaces, said tool head defining at least one generally radially extending slot open along the top and circumferential surfaces of said tool head;
   (B) a U-shaped anvil having two legs connected by a base, said U-shaped anvil matingly received in the slot defined by said tool head;
   (C) a replaceable cutter insert received between the legs of said U-shaped anvil, a portion of said cutter insert butting against said U-shaped anvil and a portion of said cutter insert butting against said tool head thereby positioning said cutter insert with respect to said tool head; and
   (D) means releasably clamping said cutter insert between the legs of said U-shaped anvil and holding said U-shaped anvil and cutter insert in the slot defined by said tool head.

2. A metal cutting tool as defined in claim 1 wherein said tool head defines a plurality of generally radially extending slots open along the top and circumferential surfaces of said tool head, said slots disposed at intervals about said tool head, and further comprising an equal plurality of said U-shaped anvils and cutter inserts, each of said plurality of slots having one U-shaped anvil and one cutter insert mounted therein.

3. A metal cutting tool as defined in claim 2 wherein said cutter inserts have regular polygonal shapes and are thereby indexible.

4. A metal cutting tool as defined in claim 3 wherein said cutter inserts are square and are each mounted with two adjacent edges thereof extending respectively from the top and circumferential surfaces of said tool head.

5. A metal cutting tool as defined in claim 3 wherein said cutter inserts are triangular and are each mounted with one edge thereof extending from the top surface of said tool head.

6. A metal cutting tool as defined in claim 1 wherein said means releasably clamping said cutter insert between the legs of said U-shaped anvil and holding said U-shaped anvil and cutter insert in the slot defined by said tool head comprises a set screw threadably received in an opening in said tool head and bearing against one leg of said U-shaped anvil.

7. A metal cutting tool as defined in claim 6 wherein said set screw has a conical point received in a conical depression in said U-shaped anvil, said conical depression disposed such that its engagement with said set screw urges said U-shaped anvil to tightly seat in the slot defined in said tool.

8. A metal cutting tool as defined in claim 1 wherein the circumferential and top surfaces of said generally cylindrical tool head are recessed adjacent the side of the slot defined in said tool head which leads as the tool head is rotated.

9. A metal cutting tool as defined in claim 1 wherein said U-shaped anvil is matingly received in the slot defined by said tool head with the base of the U-shaped anvil positioned opposite the top surface of said tool head and the legs of the U-shaped anvil extending from the base toward the top surface of said tool head.

10. A metal cutting tool as defined in claim 3 wherein:
    (1) the bases of the U-shaped anvils are accurately fabricated to be of equal thickness,
    (2) the cutter inserts are all of the same size,
    (3) each slot is defined by
       (a) parallel facing walls,
       (b) a bottom surface generally aligned with top surface of tool head against which the base of the U-shaped anvil abutts,
       (c) an inside wall surface generally aligned with the axis of rotation of the metal cutting tool, and
    (4) the bottom surfaces of the slots are carefully machined such that they and the bases of the U-shaped anvils uniformly axially support the cutter inserts with respect to a point on the axis of rotation of the metal cutting tool.

11. A metal cutting tool as defined in claim 10 wherein the inside wall surfaces of the slots are carefully machined such that they uniformly radially support the cutter inserts with respect to the axis of rotation of the metal cutting tool.

12. A metal cutting tool as defined in claim 1 wherein said cutter insert is triangular, and said portions of said cutter insert butt against surfaces on said anvil and said tool head which are diagonally disposed relative to the axis of rotation of the metal cutting tool.

13. A metal cutting tool as defined in claim 2 wherein said slots are disposed at equal intervals about said tool head.

* * * * *